United States Patent Office 3,374,993
Patented Mar. 26, 1968

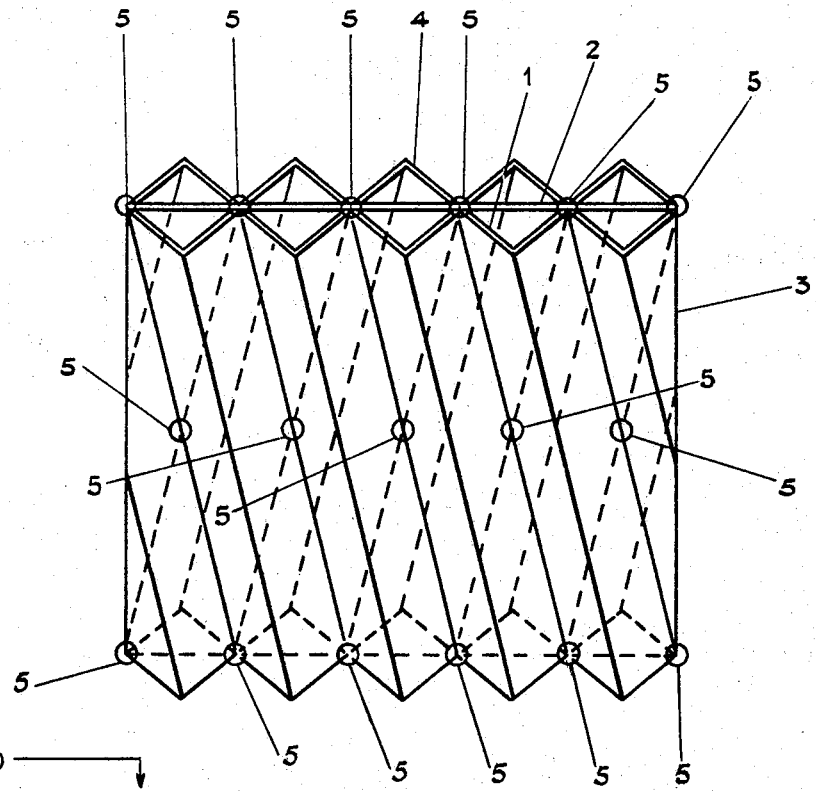
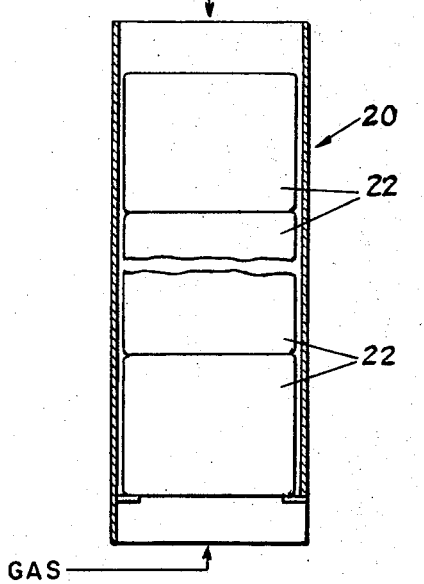

3,374,993
GAS-LIQUID CONTACT APPARATUS
Kent Reaney Greer, Marple Bridge, England, assignor to Imperial Chemical Industries Limited, London, England, a corporation of Great Britain
Filed Mar. 4, 1964, Ser. No. 349,457
Claims priority, application Great Britain, Mar. 4, 1963, 8,612/63
5 Claims. (Cl. 261—112)

This invention relates to improvements in packings and in particular to packings for use in cooling towers and more particularly to improved film-flow packings within the towers.

There are many different types of cooling towers but they can be divided broadly into two main types; the atmospheric open type in which the water is sprayed over a structure open to the atmosphere and the chimney type in which the cooling is carried out within an enclosed space, the cooling medium being supplied by induced or forced draught. The draught may be horizontal or vertical. Cooling hot water is normally carried out by allowing the water to pass downwards in such a manner as to present a large surface area to contact with a counter- or cross-current of a cold fluid, usually air. The air may enter at the bottom of the tower for counter-current cooling or may be caused to enter the side of the tower when cross-current cooling is preferred.

It is apparent that the greater the surface area of a given body of water presented to the cold air, the more efficient will be the cooling of the water, and the attainment of large surface area-to-volume ratios for the water has been achieved in different ways. In early forms the water was sprayed on to a system of closely spaced laths and slats inclined to the vertical and placed below the point of distribution of the water and within an uprising current or cross-current of cold air; the water ran down the inclined surfaces of one set of laths and dripped on to another set which was placed in spaced relationship below the first set and this process was repeated down the tower. The system is known as droplet cooling. Recently larger surface areas per unit volume of water have been attained by causing the water to flow downwards as a film over continuous supporting surfaces thus presenting a very large surface area to the current of cooling air.

For this second and improved method of water cooling known as film-flow cooling it is clear that the greater the surface area available to act as a support for the water film within a given space, the more efficient will be the cooling.

In Patent No. 3,260,511 there is disclosed packings for cooling towers which are formed from at least one unit having a structure which comprises a stack of alternate flat and corrugated sheets of rigid thermoplastic organic polymeric material held together and arranged such that the points or lines of contact of a corrugated sheet with one side of a flat sheet are co-linear with the points or lines of contact with that flat sheet of the corrugated sheet on the other side of that same flat sheet.

When making the packings described in the above application, the corrugated sheets are normally moulded to the required shape. When the corrugations of the sheets do not describe straight lines perpendicular to the top of the packing, as for example in the case of corrugations describing a sinusoidal path in the plane of the sheet, or where linear corrugations are inclined to the vertical, in order to catch the water falling upon the packing, it has been necessary either to provide two moulds or to trim part of the side of the corrugated sheets in order to provide a rectangular packing unit. I have found that the need for different moulds may be avoided in some cases by designing the packing so that identical sheets may be used to form the packings and without the need for trimming.

Therefore according to the present invention I provide a packing which comprises a rigid stack of alternate flat and corrugated sheets, characterised in that the line of the corrugations of one corrugated sheet follows a substantially different path to the line of corrugations of the corrugated sheet mounted on the other side of the flat sheet, the flat and corrugated sheets being held together and arranged such that rigidity is provided by attachment of corrugated sheets on either side of a flat sheet to each other and/or to the flat sheet, along at least part of lines or at least some points where the positions of the lines or points on the two corrugated sheets correspond with each other.

Two embodiments of the invention are illustrated by way of example only and with reference to the accompanying drawings wherein:

FIGURE 1 is a perspective view of two corrugated sheets fastened to a flat panel to form part of a packing;

Figure 3:
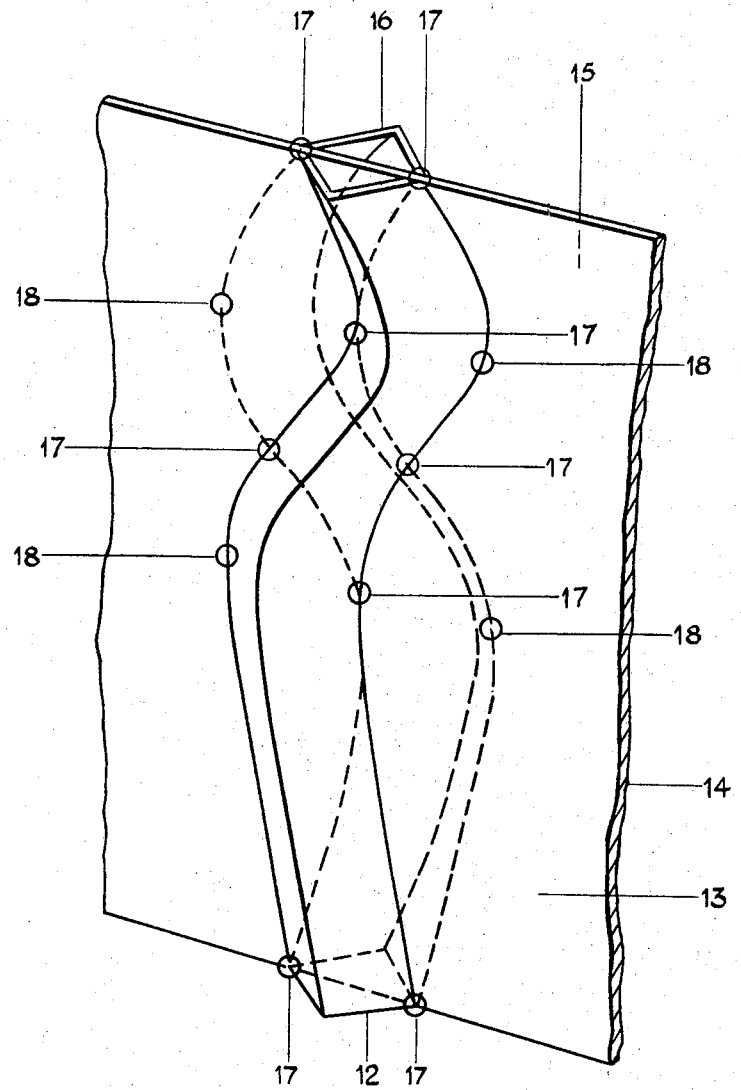

In FIGURE 3 two sheets are shown fixed to a flat sheet: the corrugations, two of which are shown, have a curved shape along their length.

FIGURE 4 is a vertical sectional view of a gas-liquid contact apparatus containing a plurality of the packing units of the present invention.

In FIGURE 1 a corrugated sheet 1 is fastened to a flat sheet 2, the corrugations of sheet 1 are linear and inclined to the edge 3 of the flat sheet. A corrugated sheet 4, being identical to sheet 1, but turned upside down, is fastened on to the back of the flat sheet 2. Thus the corrugations from one layer of the packing to the next are inclined in opposite directions. The points encircled and numbered 5 are the points where the three sheets are fastened together. These points correspond to the points where the two corrugated sheets 1 and 4 would contact each other if the flat sheet 2 was not present. It is preferable, although not essential, that all the points numbered 5 are used as points of attachment of the three sheets. However, it is essential that at least some of them are used for this purpose.

In addition to being fixed only at the points mentioned above, the corrugated and flat sheets may be fastened together at other points and in some cases the corrugated sheet may be fastened to the flat sheet, by means of a suitable adhesive, along the lines of contact of the corrugated sheet with the flat sheet.

Figure 2:
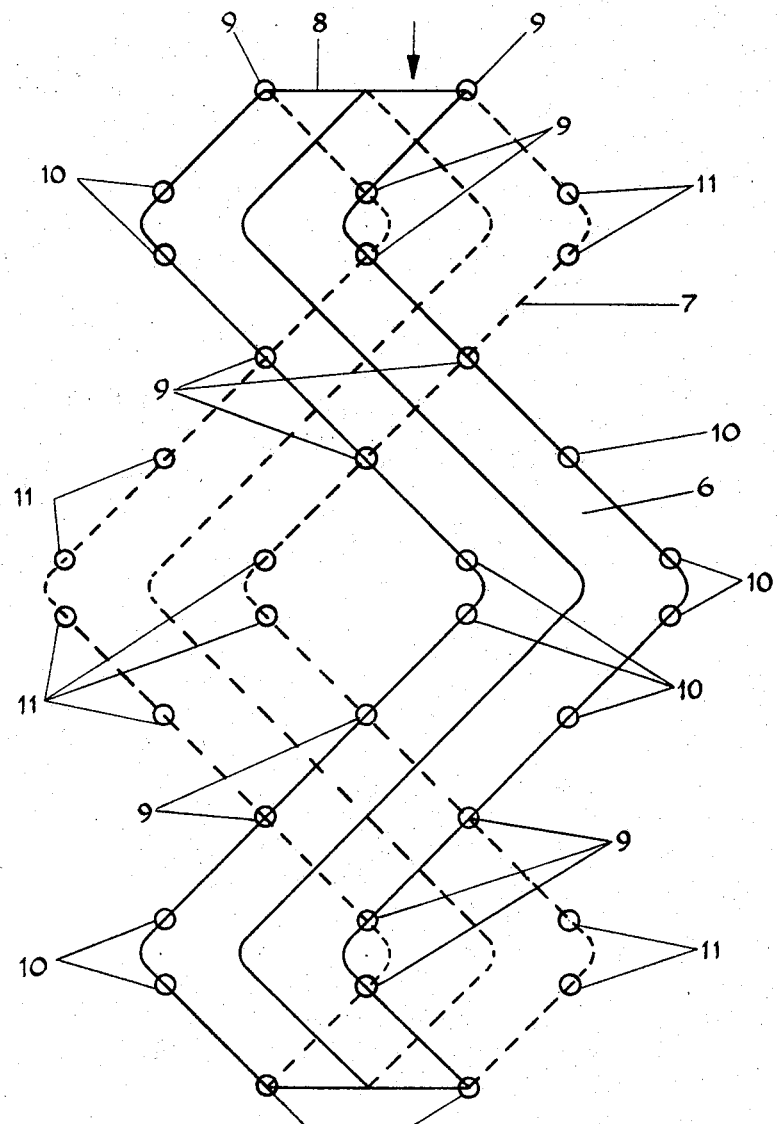
FIGURE 2 is an elevation of one corrugation of a corrugated sheet fastened to a flat sheet, the position of the corresponding corrugation of a corrugated sheet attached to the other side of the flat sheet being shown by the dotted line.

In FIGURE 2 the corrugation 6 of one sheet is shown by full lines and the corrugation 7 of the sheet fastened on the other side of the interposed flat sheet is shown by dotted lines. The top of the packing is indicated at 8, the water or other liquid entering the packing in the direction of the arrow. The fastening points where the corrugation 6 of one sheet is fastened to the flat sheet and the corrugation 7 of the second corrugated sheet are shown as circles numbered 9. The circles numbered 10 and 11 indicate where corrugations 6 and 7 respectively are fastened to the other corrugations (which are not shown) of the corrugated sheets.

In FIGURE 3, the shape of the corrugations is designed so that, when mounted vertically, all the water or other liquid entering the corrugations contacts the surfaces of the corrugation. In this case one corrugation 12 of a corrugated sheet is shown fixed to the front face 13 of a flat sheet 14. A second corrugated sheet is fixed to the rear surface 15 of the sheet 14. One corrugation 16 of this second corrugated sheet is shown. The three sheets are fastened together by press studs and sockets or other attachment areas preformed in the sheets at the points encircled and numbered 17. The points encircled and numbered 18 correspond to points where the corrugations shown are fastened to the corrugations forming the remainder of the two corrugated sheets.

FIGURE 4 illustrates schematically a gas-liquid contact apparatus, such as a cooling tower, comprising a vertical hollow tower structure 20 containing a plurality of the packing units 22 of the present invention suitably supported within the tower structure. In operation of the apparatus liquid enters the top of the tower structure and flows downwardly over the surfaces of the packing units 22 while cooling gas passes upwardly through the passages in the units 22.

When packings are made from sheets having the corrugations hereinbefore described, each packing has a low resistance to air pressure blowing in the direction opposite to the flow of liquid.

Materials that may be used for the packings of the present invention include such materials as wood, asbestos, cement, metals and rigid thermoplastic organic polymeric materials which may be used include polyvinyl chloride, polymethyl methacrylate, polypropylene, polythene, polyvinylidene chloride, copolymers of vinyl chloride and vinyl acetate, polystyrene, oxymethylene polymers, rubber/resin compositions (e.g. mixtures of butadiene/acrylonitrile copolymer rubbers and styrene/acrylonitrile resins) and polyesters such as polyethylene terephthalate.

I prefer to use thermoplastic organic polymeric materials since these are in general lighter and more readily shaped than other materials.

The flat and corrugated sheets may be fabricated from a single thickness of one of these materials or they may be formed from a plurality of layers of these materials which may be of different thicknesses, if desired.

I prefer the corrugated sheets to have a V-shaped cross section in the form of an equilateral triangle, since then the structure has good rigidity combined with a high surface area for the space occupied.

In my preferred embodiments, the equilateral triangle has a side length of 1.5" but this is by no means critical. The thickness of the flat and corrugated sheets may be chosen within a wide range of limits which depends mainly on the type of material being used and the service conditions. On the whole, I have found that in my preferred construction using sheet formed from the copolymer of vinyl chloride and vinyl acetate, the use of a sheet thickness of the order of from 0.01" to 0.03" gives rigid structures capable of spanning the distances likely to be encountered in the common run of water cooling towers. Suitable methods for holding the sheets together are described in Patent No. 3,260,511.

In my preferred example sheets measuring 72 inches by 18 inches were used to build up a structure with final dimensions of approximately 72 inches by 18 inches by 18 inches. A structure of about this size is preferred because it is of convenient size and will not be too heavy to be handled by one man. However, other considerations such as for example distances between supports for the structure may well lead to the use of structures of much larger or smaller size.

Although in my preferred embodiment I prefer to use corrugated material of which the corrugations are V-shaped in cross-section, my invention includes equally the use of corrugations of any cross-section whether it be straight sided or in the form of a continuous curve or in any intermediate form. However, when corrugations with a substantially curved cross-section are used, there is a likelihood of loss of rigidity in the structure. Similarly, the cross-section of the corrugation mentioned in my preferred embodiment need not be in the form of an equilateral triangle. Any corrugation angle may equally well be used in my invention, but the use of an angle of 60° combined with a V-shaped cross-section to give an equilateral triangle provides a structure with the optimum combination of rigidity and available surface area for the space occupied and the use of other angles will result either in loss of rigidity or in loss of available surface area.

The distance between adjacent peaks on the corrugated sheet is not critical and any distance may be chosen. However, it is apparent that as this distance is increased, the available surface area of the resultant structure for any given space occupied will be reduced and as the distance is decreased, more material per unit space will be required with consequent increase in cost and weight of the structure. I have found that my preferred dimension of 1.5" results in a most useful combination of these variables. However, in many cases a larger dimension is preferred, for example for reasons of economy or weight or in order to reduce the surface area to volume ratio.

The packings of my invention may be used for cooling many liquids and are particularly useful for corrosive liquids, the material of the packings being selected for resistance to corrosion from the liquids that will be encountered.

They may also be used where it is desirable to contact a large surface with a liquid while presenting a relatively small bulk. Such applications include the treating of effluents with micro-organisms.

I claim:

1. A gas-liquid contact unit for apparatus in which a gas stream contacts a film of liquid flowing as a film over the surfaces of a contact unit, said unit comprising:
   alternate flat and corrugated sheets of rigid thermoplastic organic polymeric material stacked in contact, the corrugations of each corrugated sheet having apieces forming lines of contact with the flat sheets;
   all the corrugated sheets defining with all the flat sheets a plurality of passages all of which extend from one common face of the stack to the opposite face;
   the corrugations in the corrugated sheets being straight throughout their entire length so that the said lines of contact and the passages are similarly straight;
   the said lines of contact on opposite sides of each of the flat sheets crossing each other so as to be coincident at the cross over points;
   the stack being held together by attachments between the corrugated sheets and the flat sheets at least some of the positions where the lines of contact on opposite sides of the flat sheets are coincident.

2. A gas-liquid contact unit as in claim 1 wherein said attachments are provided at each of said positions of coincidence.

3. A gas-liquid contact unit as in claim 1 wherein attachments between the corrugated sheets and the flat sheets are provided at locations in addition to said positions of coincidence.

4. A gas-liquid contact unit as in claim 1 wherein all said corrugated sheets are identically corrugated, alternate corrugated sheets being inverted with respect to the other corrugated sheets.

5. Gas-filled contact apparatus for contacting a gas stream with a film of liquid flowing over contact surfaces within the apparatus, said apparatus including at least one contact unit as claimed in claim 1.

References Cited

UNITED STATES PATENTS

| | | | |
|---|---|---|---|
| 520,366 | 5/1894 | Leaver | 161—136 |
| 1,240,231 | 9/1917 | Lumley | 161—137 |
| 2,054,867 | 9/1936 | Rudin et al. | 161—136 |
| 2,091,918 | 8/1937 | Finck | 161—136 X |
| 2,286,479 | 6/1942 | Farr | 55—488 |
| 2,746,892 | 5/1956 | Elfving | 161—136 |
| 2,764,257 | 9/1956 | Brixius | 55—521 X |
| 2,986,379 | 5/1961 | Kramig | 261—112 X |
| 3,112,184 | 11/1963 | Hollenbach | 161—68 X |
| 3,262,682 | 7/1966 | Bredberg | 261—29 |

FOREIGN PATENTS

| | | |
|---|---|---|
| 238,412 | 9/1911 | Germany. |
| 450,524 | 4/1935 | Great Britain. |
| 875,611 | 8/1961 | Great Britain. |
| 85,925 | 7/1920 | Switzerland. |

HARRY B. THORNTON, *Primary Examiner.*

E. H. RENNER, *Assistant Examiner.*